United States Patent [19]

Takeda et al.

[11] Patent Number: 4,819,261
[45] Date of Patent: Apr. 4, 1989

[54] PUBLIC TELEPHONE SET

[75] Inventors: Yoshiaki Takeda; Kazuo Asada; Shigehiro Eda, all of Tokyo, Japan

[73] Assignee: Tamura Electric Works, Tokyo, Japan

[21] Appl. No.: 209,612

[22] Filed: Jun. 21, 1988

[30] Foreign Application Priority Data

Sep. 10, 1987 [JP] Japan .................................. 62-225348

[51] Int. Cl.⁴ ............................................. H04M 1/24
[52] U.S. Cl. .......................................... 379/27; 379/32
[58] Field of Search ............................. 379/27, 32, 33

[56] References Cited

U.S. PATENT DOCUMENTS 4,582,965  4/1986  Lembke ................................. 379/27
4,644,109  2/1987  Takeda et al. ........................ 379/27

FOREIGN PATENT DOCUMENTS 0012102  7/1984  European Pat. Off. .
58-156259  9/1983  Japan .

Primary Examiner—Stafford D. Schreyer
Attorney, Agent, or Firm—Townsend & Townsend

[57] ABSTRACT

A public telephone set includes a communication enabling unit, a signal detector, a timer, and a CPU. The communication enabling unit enables incoming communication upon formation of a DC loop based on an incoming call. The signal detector detects a protocol signal from a maintenance center or a service center via the office line. The timer is started upon formation of the DC loop. The CPU instructs to send out alarm information to the maintenance or the service center via the office line when the signal detector generates a detection output during an operation of the timer.

8 Claims, 6 Drawing Sheets

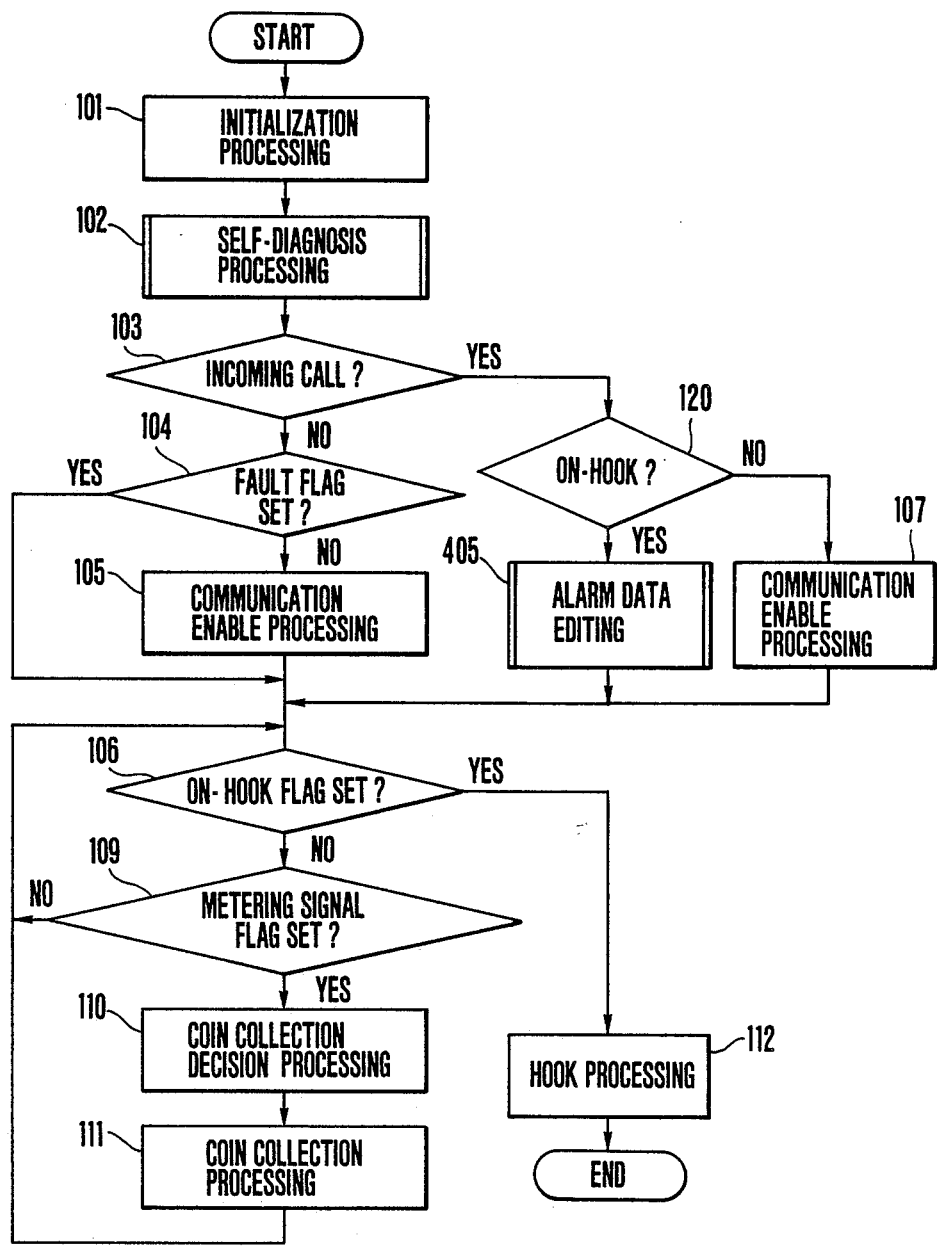
F I G. 7

PUBLIC TELEPHONE SET

BACKGROUND OF THE INVENTION

The present invention relates to a public telephone set for automatically transmitting alarm information corresponding to detection of an abnormality or fault when the abnormality is detected as a result of a self-diagnosis.

A self-diagnosis of a public telephone set (to be referred to as a telephone set hereinafter) is described in European Patent Publication No. 0012102 in detail. An alarm information transmission system in a telephone set is described in Japanese Patent Laid-Open No. 58-156259 in detail. In these prior art patents, an operation is started in response to formation of a DC loop upon an off-hook operation of a user.

Faults cannot be early found in telephone sets installed in backcountries and having low utilization efficiency since the telephone sets are not frequently used. When a message "out of order" is displayed, the telephone sets are not hooked off. The faults cannot be detected by a service or maintenance center unless the detects are acknowledged to the maintenance center through other ways. The "out-of-order" telephones are left unrepaired, and therefore, better service cannot be provided to the users.

In order to solve the above problem, a conventional telephone set is proposed in U.S. Pat. No. 4,644,109. In this telephone set, a ringing signal on the basis of ringing from the maintenance center is detected, a DC loop is automatically formed upon detection of the ringing signal, and a self-diagnosis can be automatically performed. When an abnormality is detected by this self-diagnosis, alarm information corresponding to the content of the abnormality and an assigned inherent address number are sent to an office line in the form of a predetermined signal.

In these conventional telephone sets, however, all incoming calls are regarded as polling from the maintenance center. Alarm information is transmitted in synchronism with the self-diagnosis upon reception of an incoming call. When the transmission operation is completed, the office line is disengaged from the telephone set. Therefore, communication in the disengaged state is allowed, and even if a call is not sent from the maintenance center but from a third party who wishes incoming communication, incoming communication cannot be undesirably performed.

SUMMARY OF THE INVENTION

It is an object of the present invention to provide a public telephone set for selectively performing sending of alarm information or incoming communication in such a manner that an incoming call sent from a maintenance center is discriminated from an incoming call sent from a general calling party when a self-diagnosis is performed in a response to an incoming call.

In order to achieve the above object of the present invention, according to an aspect of the present invention, an alarm information response mode or an incoming communication mode can be selected by determining whether a protocol signal can be received within a predetermined period of time upon formation of a DC loop.

According to another aspect of the present invention, the alarm information response mode or the incoming communication mode can be selected in accordance with a hook state upon formation of a DC loop.

BRIEF DESCRIPTION OF THE DRAWINGS

FIG. 7 is a flow chart corresponding to FIG. 2 and showing another embodiment of the present invention.

DESCRIPTION OF THE PREFERRED EMBODIMENTS

Preferred embodiments of the present invention will be described in detail with reference to the accompanying drawings.

Figure 1:
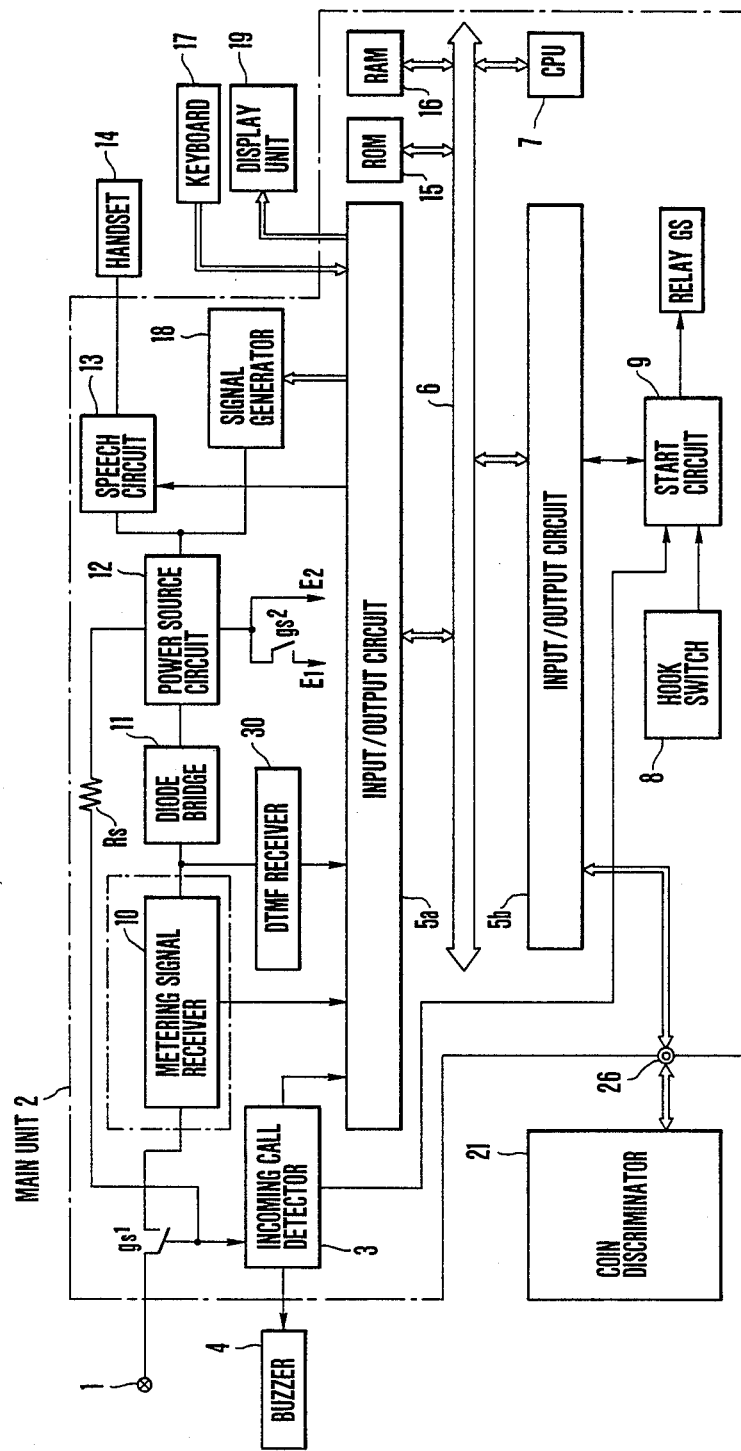
FIG. 1 is a block diagram of a telephone set according to an embodiment of the present invention.

FIG. 1 shows an overall arrangement of a telephone set according to an embodiment of the present invention. An incoming call detector 3 is electrically connected to a line terminal 1 through contact gs1 of a relay GS in a main unit 2. The line terminal 1 is connected to an office line. When the incoming call detector 3 detects a ringing signal, a buzzer 4 and a start circuit 9 (to be described later) are driven. Incoming information stored by a capacitor or the like is supplied through an input/output circuit 5a and a bus 6 to a processor (to be referred to as a CPU hereinafter) 7 such as a microprocessor started upon driving of the buzzer 4 and the start circuit 5a.

When a hook switch 8 generates off-hook information upon an off-hook operation, the start circuit 9 is responded to drive the relay GS and hence its contact gs1 in a hardware manner. The start circuit 9 causes a speech circuit 13 to connect to the line terminal 1 through a metering signal receiver 10, a diode bridge 11, and a power source circuit 12. Therefore, a DC loop is formed to engage the telephone set with the telephone line, and communication with a handset 14 can be performed.

When a line current is supplied upon formation of the DC loop, the power source circuit 12 generates a local voltage E1 on the basis of the line current having a predetermined polarity set by the diode bridge 11. The voltage E1 is supplied to the respective components through a contact gs2 which is enabled in response to the local voltage E1. The CPU 7 starts and repeats processing until the local voltage E1 is withdrawn upon release of the DC loop.

A current which does not allow an operation of an exchange is supplied from the brake side of the contact gs1 even during an on-hook state through a resistor R3 having a high resistance, thereby generating a local voltage E2. During the on-hook operation, the voltage E2 is applied to circuits which should be powered during the on-hook operation and circuits which are operated upon an off-hook operation.

Figure 2:
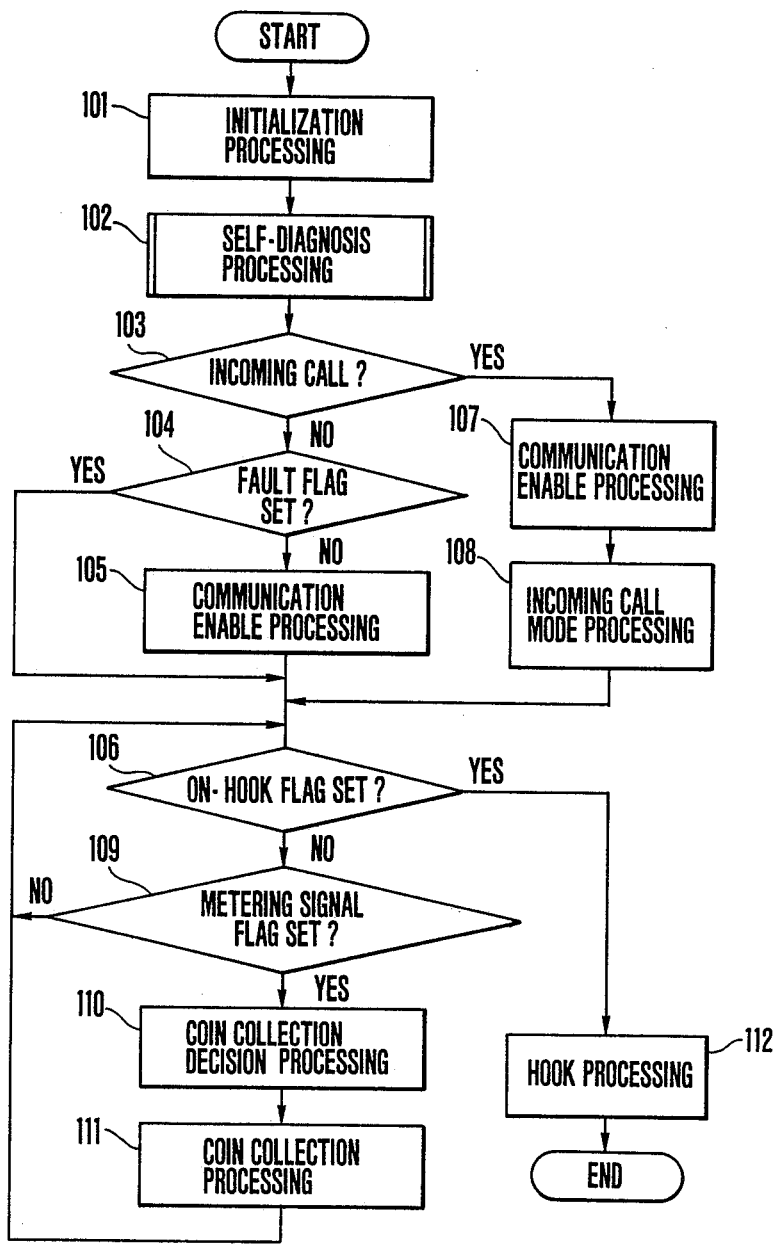
FIGS. 2 to 6 are flow charts showing control states of a CPU in the telephone set.

The CPU 7 performs communication processing programs in a ROM (Read-Only Memory) 15 connected thereto through the bus 6 and gives access to a RAM (Random Access Memory) 16 as needed. In this manner, processing operations consisting of self-diagnosis control and communication control, as shown in FIG. 2, are performed.

In the outgoing call mode, the CPU 7 sequentially controls operations such as sending of a dial tone of a dual-tone multifrequency (to be referred to as a DTMF hereinafter) from a signal generator 18, a display of a telephone charge on a display unit 19, discrimination of coins at a coin discriminator (to be referred to as a discriminator hereinafter) 21, and coin collection according to metering information from the metering signal receiver 10 in response to a metering signal supplied from an exchange. In addition, the CPU 7 performs permission of free dialing and dialing inhibition with an inhibition number in accordance with data stored in the ROM 15. Furthermore, the CPU 7 performs a forcible disconnection of communication when inserted coins are used up.

In the incoming call mode, the incoming call detector 3 supplies an incoming signal trigger to the start circuit 9 and the voltage E2 is supplied to drive the relay GS in a hardware manner. A DC loop is automatically formed upon operation of the contact gs1. The local voltage E1 is generated in the same manner as in the outgoing call mode, and the CPU 7 is started to perform a self-diagnosis operation. As a result of the self-diagnosis, if an abnormality is detected, an outgoing call is made through the line terminal 1 in accordance with alarm information corresponding to the content of the abnormality as well as an assigned inherent address number and a DTMF signal, which latter two are stored in the ROM 15.

In polling from the maintenance center, a polling signal and an alarm data editing protocol tone using the DTMF signal are sent to a DTMF receiver 30. An output from the DTMF receiver 30 is supplied to the CPU 7 through the input/output circuit 5a and the bus 6. After an alarm signal is output, the telephone set is disengaged from the office line. However, this processing is not performed when the alarm data editing protocol tone is not received.

A printed circuit board and the like are included in the main unit 2. The discriminator 21 can be detachably and electrically connected to the main unit 2 through a cord extending from the discriminator 21, a plug connected to the distal end of the cord, and a connector 26 of the main unit 2.

FIG. 2 is a flow chart showing a main routine of the CPU 7 operated upon reception of the local voltage E1. In the outgoing call mode, "initialization processing" in step 101 and "self-diagnosis processing" for a plurality of test positions in step 102 are performed. The CPU 7 determines in step 103 whether an incoming call is received. More specifically, in step 103, the CPU 103 determines whether a capacitor in a capacitor memory incorporated in the incoming call detector 3 is charged when the incoming call is received. If data is stored in the capacitor memory, the incoming call is confirmed. However, if no data is stored in the capacitor memory, the CPU 7 determines that a call is made on the basis of an off-hook operation. In this case, a decision block "fault flag set?" is checked in step 104 on the basis of a self-diagnostic result. If NO in step 104, "communication enable processing" is performed in step 105. The CPU 7 then determines "on-hook flag set?" in step 106. However, if "incoming call?" is determined to be Y (YES) in step 103, the CPU 7 performs "communication enable processing" in step 107 and determines "on-hook flag set?" (to be described later) in step 106.

If the decision block "on-hook flag set?" in step 106 is determined to be N (NO), the CPU 7 determines "metering signal flag set?" in step 109. If YES in step 109, the CPU 7 performs "coin collection decision processing" in step 110 and "coin collection processing" in step 111. The operations in steps 106 and 109 to 111 are repeated. If N in "metering signal flag set?" in step 109, the operations in steps 106 and 109 are repeated. The on-hook flag in the outgoing call mode and the on-hook flag set upon completion of transmission of alarm information from the maintenance center in the polling mode are checked. If Y in step 106, "hook processing" in step 112 is performed to deenergize the relay GS and release the DC loop.

Figure 3:
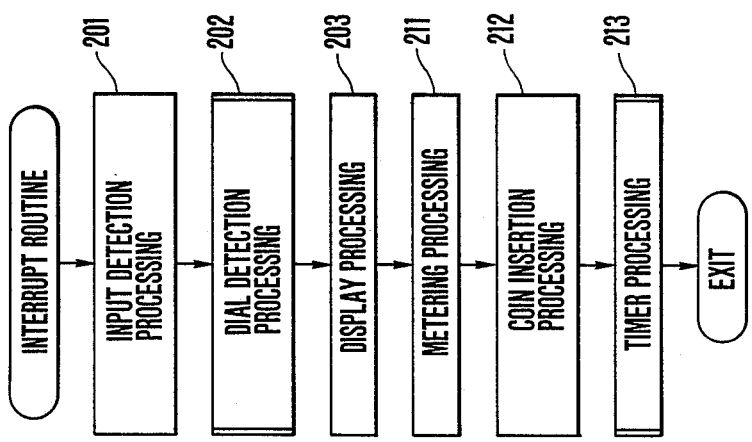

FIG. 3 is a flow chart of an interrupt routine which is repeated by the CPU 7 every 4-msec period in addition to control shown in FIG. 2. In "input detection processing" of step 201, data from the hook switch 8, the discriminator 21, the metering signal receiver 10, the keyboard 17, and the like are fetched by the CPU 7. If an on-hook state is detected, the on-hook flags corresponding to those in steps 103 and 106 of FIG. 2 are set, and then "dial detection processing" (to be described later) in step 202 is performed. The display unit 19 is driven in "display processing" in step 203 to display an amount of unused coins inserted in a coin slot. In "metering processing" of step 211, an amount represented by a metering signal is subtracted from a total amount of inserted coins to obtain an outstanding balance. The CPU 7 then performs "coin insertion processing" in step 212 wherein the inserted coins are detected, and their denominations are discriminated, and an amount of the currently inserted coins is added to the outstanding balance. The CPU 7 then performs "timer processing" (to be described later) in step 213 to monitor an excitation period of a collection magnet, a local call time, and various control times. Proper control operations are performed upon lapses of the preset times.

Figure 4:
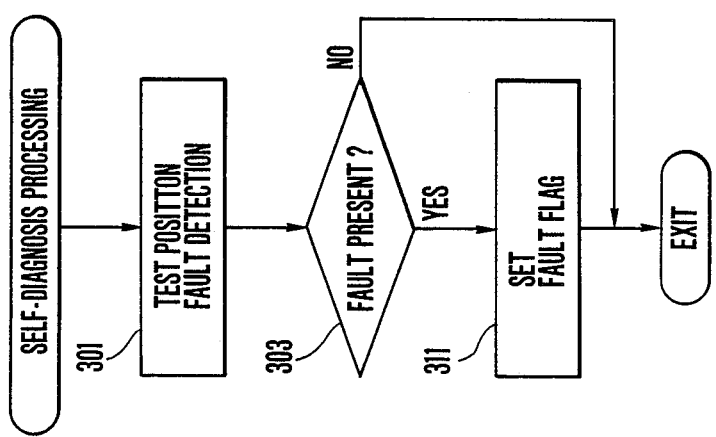

FIG. 4 is a flow chart showing a subroutine of step 102 in FIG. 2. The CPU 7 performs "test position fault detection" in step 301 to check whether current initial states of the respective components are normal initial states. If any fault is detected, the decision block fault present?" in step 303 is determined to be Y. Therefore, a fault flag corresponding to that of step 104 in FIG. 2 is set in step 311.

Figure 5:
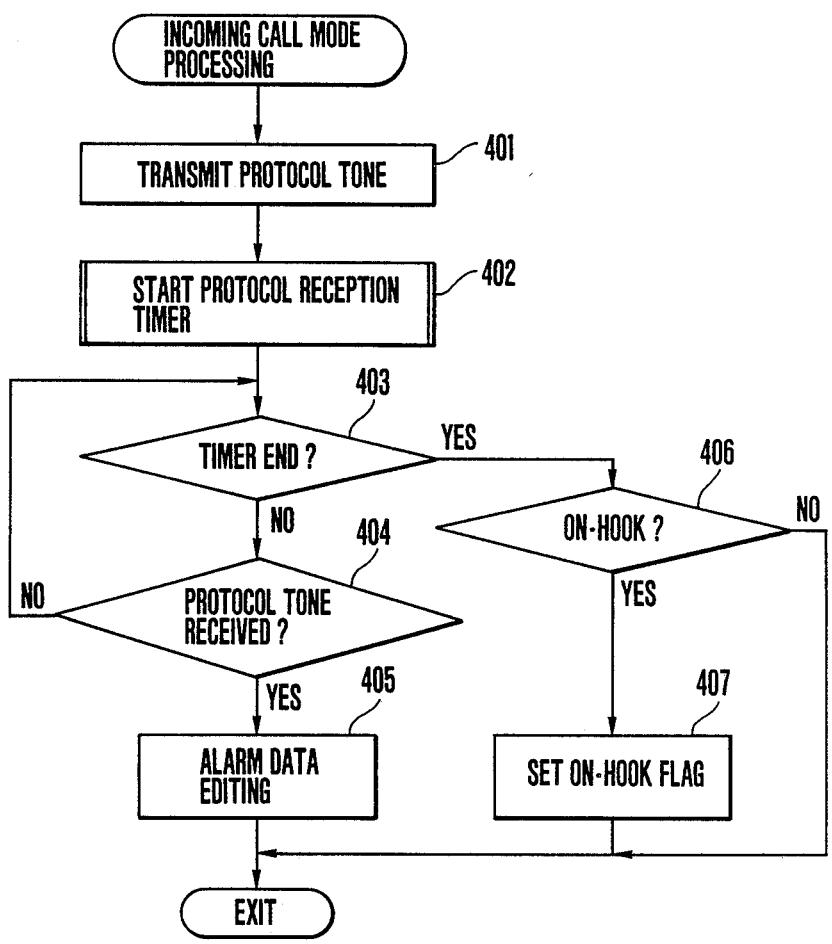

FIG. 5 is a flow chart showing a subroutine of the "incoming call mode processing" in step 108 of FIG. 2. When an incoming call is detected, a protocol tone is transmitted in step 401. This tone is, e.g., the "A" tone of the DTMF signal. The DTMF signal represent 16 (=4×4) types of tone. For this purpose, 12 (=4×3) keys are used. DTMF outputs which do not correspond to the keys serve as the A, B, C, and D tones. In this embodiment, the A tone is used.

The protocol tone is generated in correspondence with an incoming call from the maintenance center in the polling mode. After the maintenance center receives the protocol tone transmitted in step 401, an alarm data editing protocol tone used in step 404 (to be described later) is sent back from the maintenance center. If an incoming call is not made by the maintenance center but by a third party for simple communication, the protocol tone sent in step 401 is neglected in the calling end since the calling end does not have a function for detecting the protocol tone.

When sending of the protocol tone in step 401 is completed, the protocol reception timer is started in step 402. The CPU 7 then determines "timer end?" in step 403 to check whether the preset timer time has elapsed. When the alarm data editing protocol tone is sent from the maintenance center within the timer time, the decision block "protocol received?" in step 404 is determined to be Y. The CPU 7 performs "alarm data editing" in step 405. In this case, alarm data editing varies in accordance with contents of the tones represented by the DTMF signal sent from the maintenance center:

"1": coin collection data
"2": maintenance data
"3": coin collection and maintenance data If the tone represents "4", "data conversion" processing such as change in destination for automatic dialing is performed.

When an incoming call is made by a general third party, an alarm editing protocol tone is not sent from the third party. When the maximum time of the protocol reception timer has elapsed, Y is established in step 403, and a hook state of a response to an incoming call is detected in step 406. More specifically, when an operator as a called party picks up the handset before an automatic response to the incoming call is made, N is established in "on-hook?" in step 406. The "incoming call mode processing" in step 108 of FIG. 2 is completed. Incoming communication is allowed during repetition of Ns in steps 106 and 109. An on-hook operation is performed by the destination operator, the on flag is set in the "input detection processing" in step 201 of FIG. 3. On the basis of this operation, the decision block "on-flag set?" in step 106 of FIG. 2 is determined to be Y. Incoming communication is then terminated in the "hook processing" in step 112.

However, when an automatic response is made to a general incoming call, since Y is established in step 406, the on-hook flag is set in step 407. After the operation in step 108 is completed and Y is established in step 106, the flow advances to step 112. Therefore, incoming communication is completed.

Figure 6:
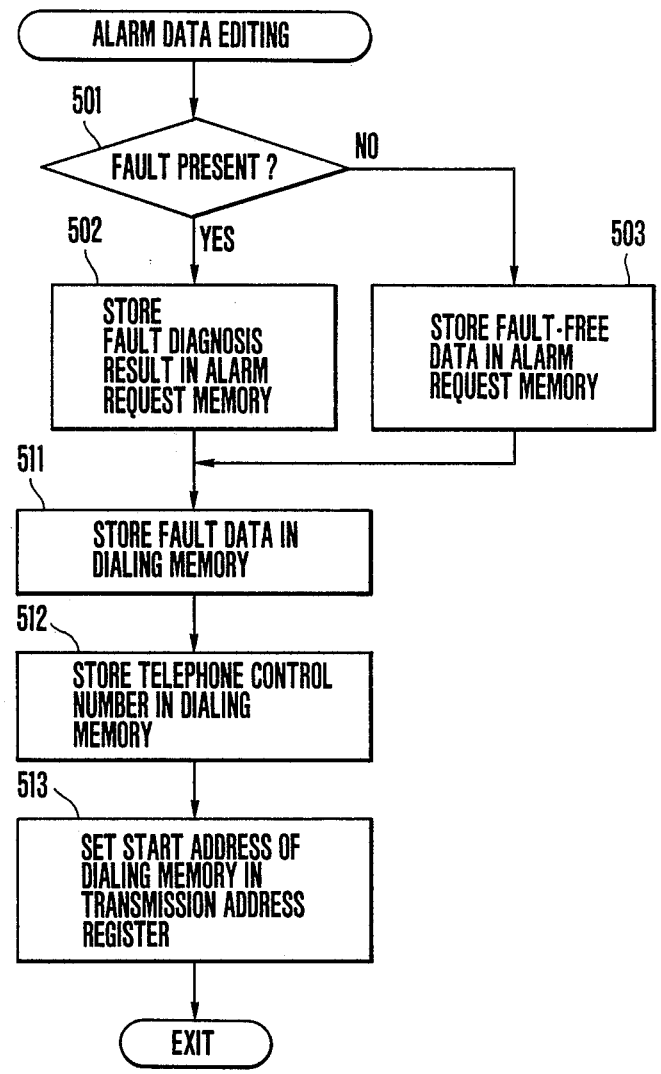

FIG. 6 is a flow chart showing a subroutine of step 405 in FIG. 5. If Y in "fault present?" in step 501, a fault diagnosis result is stored in an alarm request memory in step 502. However, if N in step 501, fault-free data is stored in the alarm request memory in step 503. The fault data and the telephone set control number data are stored in a dialing memory in the RAM 16 in steps 511 and 512, respectively. A start address of the dialing memory is set in a dial signal transmission address register in step 513.

All fault portion data and their control numbers are stored at addresses of the dialing memory in steps 511 and 512 in the following manner.

| Address No. | Data | Address No. | Data |
| --- | --- | --- | --- |
| N0 | ** | N8 | Control No. (1st digit) |
| N1 | ** | N9 | Control No. (2nd digit) |
| N2 | Fault Position No. (Lower digit) | N10 | Control No. (3rd digit) |
| N3 | Fault Position No. (Upper digit) | N11 | Control No. (4th digit) |
| N4 | # | N12 | Control No. (5th digit) |
| N5 | Fault Position No. (Lower digit) | N13 | # |
| N6 | Fault Position No. (Upper digit) | N14 | # |
| N7 | ## | N15 | 1F |
|  |  | N16 | 1F |

Note: ** ... start signal; # ... space signal; ## ... end signal
1F ... initial data (no data)

The type of data stored in step 502 is determined by the type of protocol tone received in step 404.

The alarm editing data set in this manner is sent out to an office line by using transmission processing of a normal DTMF dial signal (not shown) in steps 202 and 213 of FIG. 3. Output processing is performed in this transmission processing. When an output is completed, the on-hook is set. Therefore, during processing, the transmission operation is completed upon detection of the on-hook flag, and the telephone set is disengaged from the office line.

According to the present invention as described above in detail, since the presence/absence of the protocol tone within the timer time determines whether an incoming call is made from the maintenance center in the polling mode or an incoming call is made for general incoming communication. Therefore, when the incoming call is detected to be made for general incoming communication, the telephone set is not disengaged from the office line, and communication is allowed.

FIG. 7 shows another embodiment of the present invention and corresponds to FIG. 2. Since the reference numerals used in FIG. 7 correspond to those in the above embodiment, and a detailed description thereof will be omitted. Referring to FIG. 7, "self-diagnosis processing" in step 102 is performed, and a CPU 7 determines in step 103 whether a DC loop is formed in association with an incoming call. If Y (YES) in step 103, the flow advances to step 120. The CPU 7 determines "on-hook?" in step 120. In this case, if N (NO) in step 120, i.e., an off-hook state is detected, an operator responds to the incoming call. In this case, the flow advances to step 107 in which "communication enable processing" is performed. The flow then advances to step 106. Therefore, if the off-hook state is detected in step 120, alarm information processing is not performed. However, when the on-hook state is detected in step 120, the public telephone set automatically responds to polling from the maintenance center. "Alarm data editing" in step 405 is performed. A preparation for sending out alarm information to the office line is performed. When the "alarm data editing" is completed, the flow advances to step 106. Other operations in FIG. 7 are the same as those in FIG. 2.

What is claimed is:

1. A public telephone set having an alarm information transmission function for performing a self-diagnosis for predetermined test positions upon detection of a ringing signal from an office line and automatically forming a DC loop, for transmitting a self-diagnostic result in a predetermined form of a signal, and for releasing the DC loop, comprising:

communication enabling means for enabling incoming communication upon formation of the DC loop based on the incoming call;

signal detecting means for detecting a protocol signal from a maintenance center or a service center via the office line;

timer means started upon formation of the DC loop; and control means for sending out alarm information to said maintenance center or said service center via the office line when said signal detecting means generates a detection output during an operation of said timer means.

2. A set according to claim 1, further comprising means for sending out the protocol signal having a specific frequency to the office line upon formation of the DC loop.

3. A set according to claim 1, wherein said control means sends out collection data and/or maintenance data as the alarm information in accordance with a type of protocol signal received from the office line and detected by said signal detecting means.

4. A set according to claim 3, wherein said control means changes preset data in accordance with the type of protocol signal.

5. A set according to claim 1, further comprising hook state determining means for determining a hook state on the basis of a time-up output from said timer means, and wherein said control means continues the incoming communication when said hook state determining means determines an off-hook state, and releases the office line from the telephone set when said hook state determining means determines an on-hook state.

6. A set according to claim 1, wherein said control means sends out fault data and an address data assigned inherently to the telephone set as the alarm information.

7. A set according to claim 1, further comprising a dialing memory, and wherein said control means sets the alarm information in said dialing memory and sends out the alarm information to the office line in accordance with a DTMF (dual-tone multifrequency) signal based on the alarm information.

8. A public telephone set having an alarm information transmission function for performing a self-diagnosis for predetermined test positions upon detection of a ringing signal from an office line and automatically forming a DC loop, for transmitting a self-diagnostic result in a predetermined form of a signal, and for releasing the DC loop, comprising:

hook state determining means for determining a hook state upon formation of the DC loop in response to an incoming call; and control means for allowing incoming communication when said hook state determining means determines an off-hook state and for sending out the alarm information to the office line when said hook state determining means determines an on-hook state.

* * * * *